US012746590B2

(12) United States Patent
Caprotti et al.

(10) Patent No.: US 12,746,590 B2
(45) Date of Patent: Sep. 29, 2026

(54) METHOD OF BENDING AND BENDING MACHINE FOR THE EXECUTION OF A METHOD OF BENDING

(71) Applicant: BLM S.P.A., Cantu' (IT)

(72) Inventors: Fabrizio Caprotti, Cantu' (IT); Andrea Baraldo, Cantu' (IT); Angelo Ponti, Cantu' (IT); Luca Bascetta, Milan (IT); Gianni Ferretti, Milan (IT)

(73) Assignee: BLM S.P.A., Cantu' (IT)

( * ) Notice: Subject to any disclaimer, the term of this patent is extended or adjusted under 35 U.S.C. 154(b) by 248 days.

(21) Appl. No.: 18/573,154

(22) PCT Filed: Jul. 1, 2022

(86) PCT No.: PCT/IB2022/056145
§ 371 (c)(1),
(2) Date: Dec. 21, 2023

(87) PCT Pub. No.: WO2023/275840
PCT Pub. Date: Jan. 5, 2023

(65) Prior Publication Data

US 2024/0286184 A1 Aug. 29, 2024

(30) Foreign Application Priority Data

Jul. 1, 2021 (IT) ........................ 102021000017384

(51) Int. Cl.

| | |
|---|---|
| ***B21D 7/12*** | (2006.01) |
| ***B21D 43/00*** | (2006.01) |
| ***G05B 19/042*** | (2006.01) |

(52) U.S. Cl.
CPC ............. *B21D 7/12* (2013.01); *B21D 43/003* (2013.01); *G05B 19/0428* (2013.01); *G05B 2219/2639* (2013.01)

(58) Field of Classification Search
CPC . B21D 7/02; B21D 7/024; B21D 7/12; B21D 43/003
See application file for complete search history.

(56) References Cited

U.S. PATENT DOCUMENTS

| | | | |
|---|---|---|---|
| 6,167,740 | B1 | 1/2001 | Lipari et al. |
| 11,027,323 | B2 | 6/2021 | Grapsas |
| 2001/0016805 | A1 | 8/2001 | Gupta et al. |

FOREIGN PATENT DOCUMENTS

| | | | |
|---|---|---|---|
| EP | 1681607 | A2 | 7/2006 |
| EP | 3211499 | A2 | 8/2017 |

(Continued)

OTHER PUBLICATIONS

CN 106944511A, Zhu et al. Jul. 2017.*

(Continued)

*Primary Examiner* — Edward T Tolan
(74) *Attorney, Agent, or Firm* — Leason Ellis LLP

(57) ABSTRACT

A method for the bending of a tubular metal article comprising at least the following steps a) determining a bending sequence of the tubular metal article by means of a calculating unit, and b) bending the tubular metal article according to the bending sequence determined during the execution of the step a) is described. During the step a) at least the following sub-steps are performed by the calculating unit: a1) defining an initial configuration and a final configuration of the tubular metal article which differs from the initial configuration by a number N of bends, a2) determining one or more explorative bending sequences as a function of the initial configuration and the final configuration, each explorative bending sequence having a cost and a3) proposing at least one or more explorative bending sequences having minimal costs as the determined bending sequence.

12 Claims, 5 Drawing Sheets

(56) References Cited

FOREIGN PATENT DOCUMENTS

| | | | |
|---|---|---|---|
| JP | H0195819 | A | 4/1989 |
| JP | 2003326319 | A | 11/2003 |
| JP | 2010042499 | A | 2/2010 |
| JP | 2017134829 | A | 8/2017 |
| WO | 2014185531 | A1 | 11/2014 |

OTHER PUBLICATIONS

Translation CN 106944511A, Zhu et al. Jul. 2017.*
CN 110883153A, Guo et al. 03-20202.*
Translation CN 110883153A, Guo et al. Mar. 2020.*
CN 111185505A, Wu et al. May 2020.*
International Search Report and Written Opinion in corresponding International Patent Application No. PCT/IB2022/056145, mailed Sep. 26, 2022 (14 pages).
Notice of Reasons for Refusal in JP Application No. 2023-579836, mailed Feb. 27, 2026, an English translation attached hereto (11 pages).

* cited by examiner

METHOD OF BENDING AND BENDING MACHINE FOR THE EXECUTION OF A METHOD OF BENDING

CROSS-REFERENCE TO RELATED APPLICATIONS

This patent application is a U.S. National Phase Application under 35 U.S.C. § 371 of International Patent Application No. PCT/IB2022/056145, filed on Jul. 1, 2022, which claims priority from Italian patent application no. 102021000017384, filed on Jul. 1, 2021, all of which are incorporated by reference, as if expressly set forth in their respective entireties.

TECHNICAL FIELD

The present invention relates to a method of bending a tubular metal article, in particular a metal wire or a metal tube, for obtaining a certain bent tubular article. In particular, the present invention relates to a method of bending a tubular metal with article an improved determination of the sequence of the bends.

Advantageously, the present invention also relates to a bending machine, in particular a wire bending machine or tube bending machine, for the bending of tubular metal articles.

STATE OF THE ART

Bending machines are known for the bending of metal wires or for the bending of metal tubes.

Such machines are configured to execute a series of bends for obtaining a bent wire or a bent tube, respectively.

It is also known that these machines comprise at least one bending head having one or more bending groups for carrying out the bends and an activation apparatus for carrying out relative movements between the bending head and the wire or the tube.

The activation apparatus allows to obtain a relative positioning between the wire or the tube and at least one of the bending groups so that said bending group can carry out a respective bending.

It is known that the activation apparatus may be configured to move and/or rotate the bending head and/or advance and/or rotate the wire or the tube along or about an axis.

A typical bending group comprises a turret having one or more engagement elements, each configured to contact the wire or the tube and an actuator coupled to the turret and configured to rotate and translate the turret around and along an axis for bending the wire or the tube.

Typically, each wire or tube is subjected to a bending sequence by a method that provides both information regarding the bending itself (steps of curving) and information regarding the positioning of the wire or the tube (steps of alignment to change the relative position between the bending head and the wire or the tube), to obtain the respective bent wire or the respective desired bent tube.

The bending sequence must be chosen so that the wire or the tube does not interfere with parts of the bending machine and/or with itself at any time during the execution of the bending sequence.

In order to avoid these problems, an operator must manually define the bending sequence. These operations take a significant amount of time and become more and more difficult and time-consuming as the complexity of the final bent wire or tube increases.

Furthermore, it should be considered that the definition of such operations requires not only a high level of experience of the operator, but also a high basic qualification. These aspects can be problematic in countries where there is a shortage of skilled workers. In addition, a drawback may develop in contexts in which there is a high turnover of operators.

DISCLOSURE OF INVENTION

Therefore a need is felt in the sector for a further improvement of the methods of bending a nd/or of the bending machines which will allow to solve at least one of the known drawbacks.

In particular, there is a need felt in the sector for a method of bending and/or a bending machine that allows a reduction in the times required for the determination of the bending sequences.

The aforesaid aims are achieved by the present invention, since it relates to a method of bending a tubular metal article and a corresponding machine as defined herein.

BRIEF DESCRIPTION OF THE DRAWINGS

For a better understanding of the present invention, three preferred embodiments are described below, by way of non-limiting example only and with reference to the accompanying drawings, wherein.

BEST MODE FOR CARRYING OUT THE INVENTION

Figure 1:
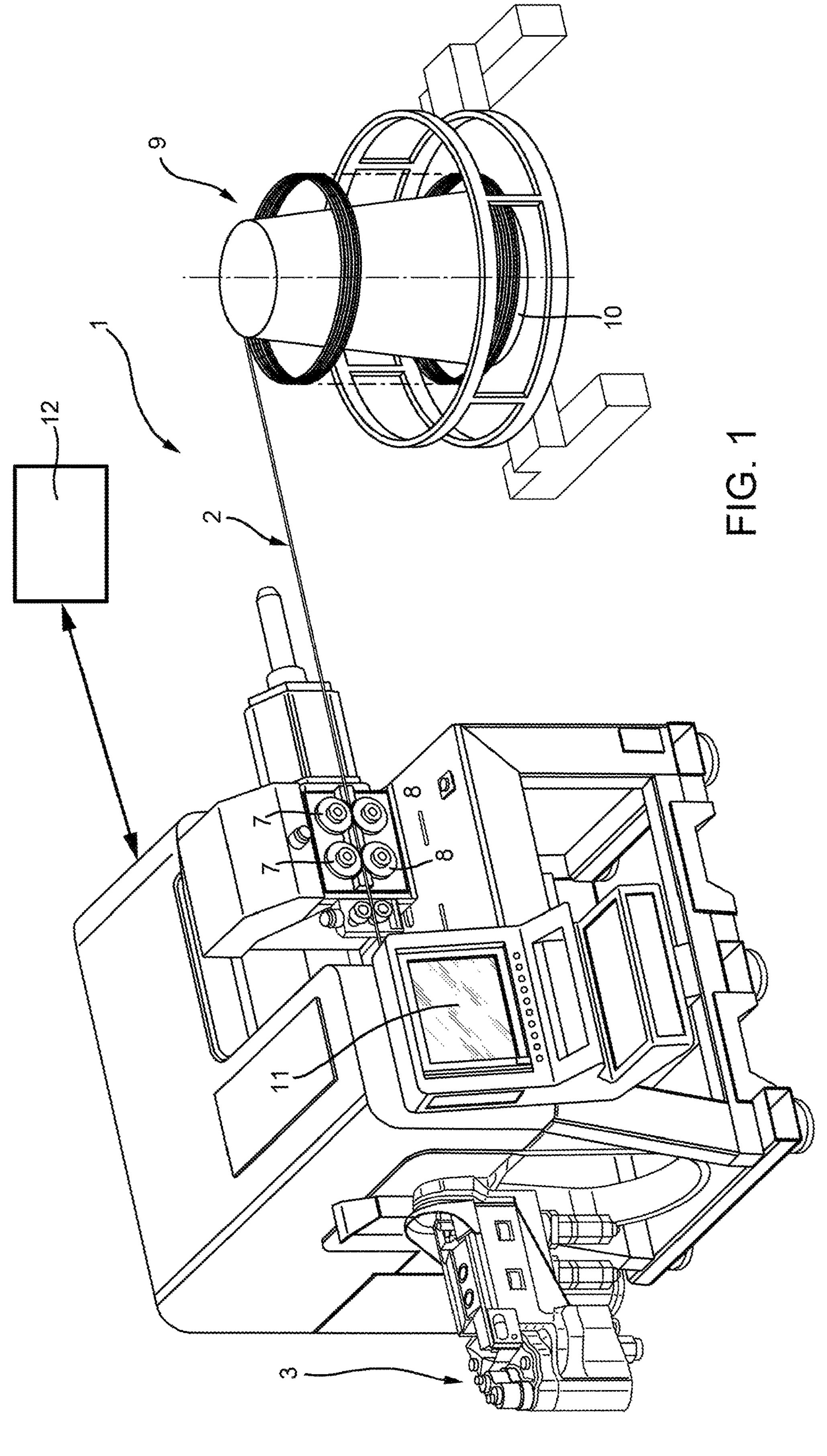
FIG. 1 schematically and partially shows a first embodiment of a bending machine according to the present invention, with parts removed for clarity's sake.

In FIG. 1, 1 denotes as a whole a (n) (automatic) bending machine for the bending of tubular metal articles to obtain bent tubular metal articles.

Specifically, a tubular metal article can be a metal wire or a metal tube 2.

According to some non-limiting embodiments, the tubular metal articles may have circular, oval, rectangular, square, elliptical or any other shaped cross-sections.

According to some non-limiting embodiments, the tubular metal articles may be hollow or solid.

According to some non-limiting embodiments, the tubular metal article comprises at least one metal material. According to some non-limiting variations, the metal articles could also comprise at least one non-metal material such as for example a composite material or a plastic material.

Reference is made hereinafter without limitation to the example of the bending of metal tubes 2 for obtaining bent tubes 2. However, the following description also applies to the bending of other tubular metal articles such as metal wires to obtain the respective tubular metal articles.

In addition, a bending machine 1 for the bending of metal tubes 2 is described in detail below without any limiting intent. However, the following description could also apply to bending machines 1 for the bending of tubular metal articles such as for example metal wires.

Figure 2:
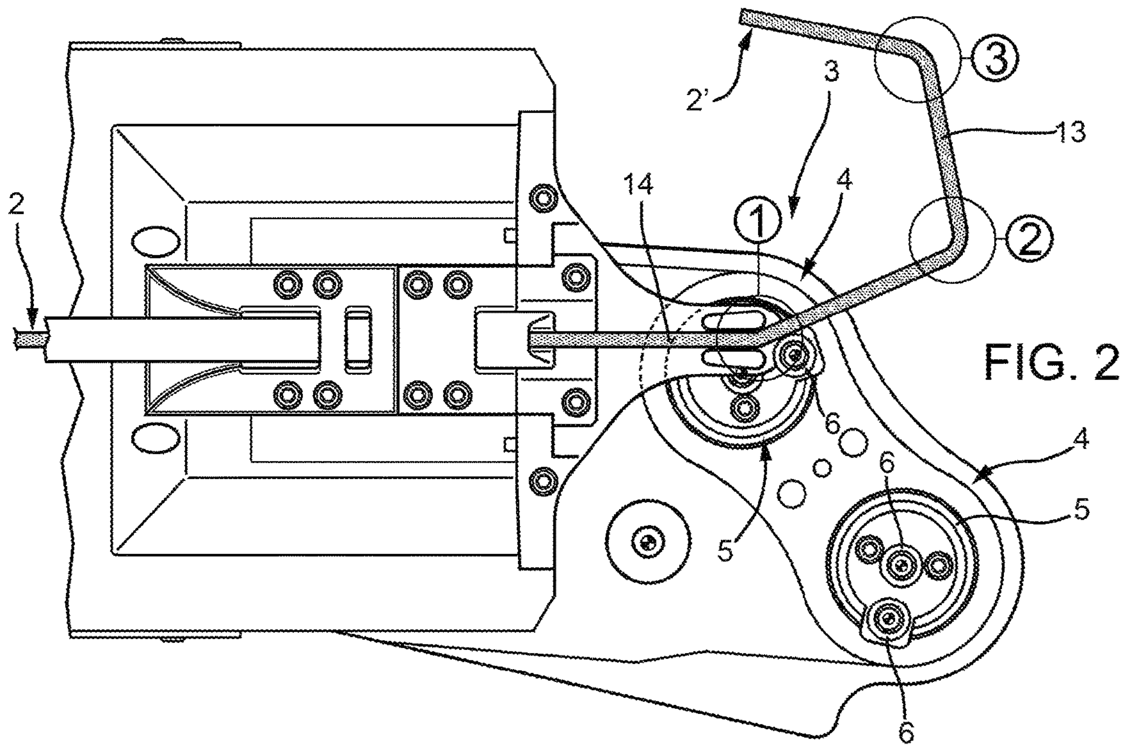
FIG. 2 shows in an enlarged view and in isometry a detail of the bending machine of FIG. 1 together with a bent tube, with parts removed for clarity's sake.

With particular reference to FIGS. 1 and 2, the bending machine 1 comprises at least:

- a control unit configured to control the operation of the bending machine 1 itself;
- a bending head 3, in particular operatively connected to the control unit and, configured to bend the tubes 2, in particular at a bending station; and
- an activation apparatus, in particular operatively connected to the control unit and configured to control and/or execute a relative movement between the bending head 3 and the tube 2.

In greater detail, the bending head 3 comprises one or more bending groups 4, in the specific case shown two, each bending group 4 being configured to selectively bend the tube 2. In other words, each bending group 4 is configured to bend the tube 2.

In further detail, each bending group 4 may comprise at least:

- a respective turret 5, in particular movably inserted into a respective housing seat of the bending head 3;
- one or more engagement elements 6 integral with the respective turret 5; and
- a first actuation device (known per se and not shown), in particular operatively connected to the control unit and coupled to the respective turret 5 and configured to actuate an angular movement and/or a translation of the turret 5.

Furthermore, the control unit is configured to control each first actuation device so as to determine the bending operations by means of the angular movement and/or the translation of the turret 5 and consequently the relative displacements of the engagement elements 6.

In this specific case, each first actuation device comprises at least one (electric) motor to determine and/or activate the angular movement of the respective turret 5 and/or a linear actuator, for example a pneumatic actuator, to determine the translation of the respective turret 5.

Figure 5:
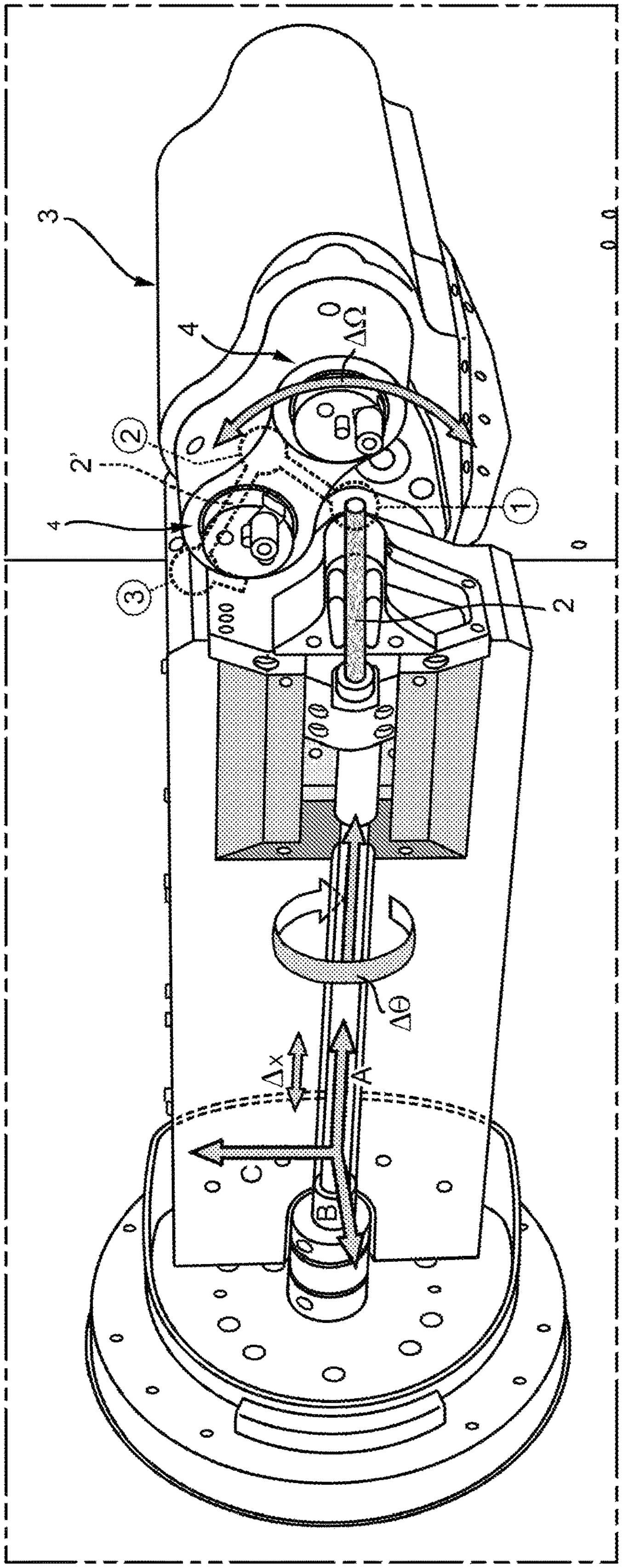
FIG. 5 shows in an enlarged view and in isometry a detail of the machine according to FIG. 1, with parts removed for clarity's sake.

In greater detail and with reference to FIG. 5, the activation apparatus may be configured to move and/or rotate the tube 2 along and around a first axis A, respectively. Furthermore, the activation apparatus may be configured to rotate the bending head 3 around a second axis B.

In further detail, the activation apparatus can be provided with one or more second actuation devices configured to move the tube 2 along the and/or to rotate the tube 2 about the first axis A.

Alternatively or additionally, the activation apparatus can be provided with one or more third actuation devices configured to at least rotate the bending head 3 about the second axis B.

According to the non-limiting embodiment shown, the activation apparatus comprises a first group of advancement wheels 7 arranged one after the other and a second group of advancement wheels 8 arranged one after the other. In particular, each advancement wheel 7 faces a respective advancement wheel 8 so that the advancement wheels 7 and the advancement wheels 8 act on opposite sides on the tube 2.

In particular, the first group and the second group are arranged upstream of the bending head 3.

Further, the bending machine 1, in particular the bending head 3, could comprise a cutting unit configured to cut the tube 2.

With particular reference to FIG. 1, the bending machine 1 may further comprise a storage device 9 containing the (not bent) tube 2. In particular, the activation apparatus can be configured to advance the tube 2 from the storage device 9 towards the bending head 3.

In greater detail, the storage device 9 is configured to contain the tube 2 in the form of a roll.

In further detail, the storage device 9 comprises a support 10 carrying the tube 2 in the form of a roll, in particular the support 10 is designed to allow the unwinding of the tube 2 arranged in the form of a roll.

With particular reference to FIG. 1, the bending machine 1 may further comprise a human-machine interface 11 configured to allow an operator to transmit instructions to the bending machine 1, in particular to the control unit, and/or to receive information from the bending machine 1.

Advantageously, the bending machine 1 comprises a calculating unit 12, in particular operatively connected to the control unit, configured to determine a bending sequence of the tube 2 to obtain the bent tube 2'. In particular, the calculating unit 12 can be arranged locally and/or remotely.

In use, the bending machine 1 bends the tube 2 for obtaining a (determined) bent tube 2'.

In particular, the shape (configuration) of the bent tube 2' is defined before the method of bending is activated. More specifically, the control unit contains information relating to the bent tube 2'.

In particular, the bent tube 2' is distinguished from the tube 2 by a number N of bends.

In greater detail, the bending machine 1 bends the tube 2 according to a determined bending sequence; in particular, the determined bending sequence comprises N bends.

The determination of the bending sequence of the tube 2 is made prior to the execution of the bending sequence by the bending machine 1.

In greater detail during the execution of the method of bending, the following steps are performed:

a) determining the bending sequence of the tubular metal article 2 by means of the calculating unit 12; and b) bending the tube 2 according to the bending sequence determined during the execution of the step a).

More specifically, the bending sequence defines a plurality of steps of execution (a plurality of bends), in particular N steps of execution, which are executed one after the other, and each step of execution has a respective step of alignment and a respective step of curving which, in particular, is executed following the execution of the respective step of alignment.

During each step of alignment a relative position between the tube 2 and the bending head 3, in particular of the one or more bending groups 4, is modified and during each step of curving the bending head 3, in particular at least one of the bending groups 4, even more particularly at least one of the turrets 5 (by means of at least one engagement element 6), performs a local bending of the tube 2.

In greater detail, after the execution of each step of curving, the tube 2 presents a (new) intermediate configuration.

In even greater detail, prior to the execution of the first step of curving, the tube 2 presents a (substantially) linear configuration (the tube 2 extends along a longitudinal axis, in particular parallel, even more particularly coaxial, to the first axis A). After executing the last step of curving, the tube 2 corresponds to the bent tube 2'.

In still further detail, during each step of curving, the respective bending of the tube 2 is obtained by activating the respective bending group 4, in particular of the respective turret 5, and a first (free) portion 13 of the tube 2 relative to a second portion 14 of the tube 2 is bent (see FIG. 2), e.g. this second portion 14 being held stationary during the execution of the respective step of bending. In particular, during each step of curving an angle defined between the first portion 13 and the second portion 14 is obtained. Even more particularly, at least the specific shape of the first portion 13 varies from one step of curving to the other and/or the defined angles may vary between steps of curving.

Furthermore, during each step of curving at least one of the first actuation devices activates the respective bending group 4, in particular the respective turret 5 to execute the respective bending of the tube 2.

Preferably, during the execution of each step of curving, the tube 2 is tightened, i.e. the tube 2 can neither translate along the nor can it rotate about the first axis A.

More specifically, during the step of alignment, the correct positioning of the tube 2 relative to a specific bending group 4 is obtained so that it can perform the correct bending, i.e. so that it can perform the correct step of curving.

In further detail, during each step of alignment, the second actuation devices move the tube 2 along the and/or rotate the tube 2 about the first axis A and/or one or more third actuation devices at least rotate the bending head 3 about the second axis B.

Furthermore, during the method and before the execution of the step a) and step b), an initialization step is performed during which the shape of the bent tube 2' is defined.

More specifically, during the initialisation step, the shape of the bent tube 2' is inserted and/or read and/or retrieved by the control unit. In particular, the shape of the bent tube 2' is provided digitally and describes the three-dimensional configuration of the bent tube 2'.

In further detail, the shape of the bent tube 2' may be provided to the control unit by one or more software systems which in turn may be based on Computer-Aided Design (CAD) and/or Computer-Aided Manufacturing (CAM) software and/or distributed computer systems for monitoring and supervision (also known as SCADA).

Preferably, a step of cutting can also be performed during the method, during which the bent tube 2 or the tube 2' is cut. In particular, the step of cutting can be performed before, during or after the execution of the bending sequence.

Preferably, one or more repetition steps are executed during which the step b) is repeated with a new tube 2 based on the bending sequence determined during the execution of the step a) (and without step a) being performed again). In this way, mass production is achieved.

In greater detail and with reference to FIGS. 2 to 5, at least the following sub-steps are executed by the calculating unit 12 during the step a):

- a1) defining an initial configuration 20 and a final configuration 21 of the tube 2 (see, for example, FIG. 4), where the final configuration 21 differs from the initial configuration by a number N of bends;
- a2) determining one or more explorative bending sequences 22 as a function of the initial configuration 20 and the final configuration 21, each explorative bending sequence 22 having a cost which is a function of the bending costs in terms of energy and/or time; and
- a3) proposing at least one or more explorative bending sequences 22 having minimal costs, particularly compared to other possible bending sequences, as the determined bending sequence.

In particular, the calculating unit 12 receives information relating to the shape of the bent tube 2' from the control unit.

Figure 3:
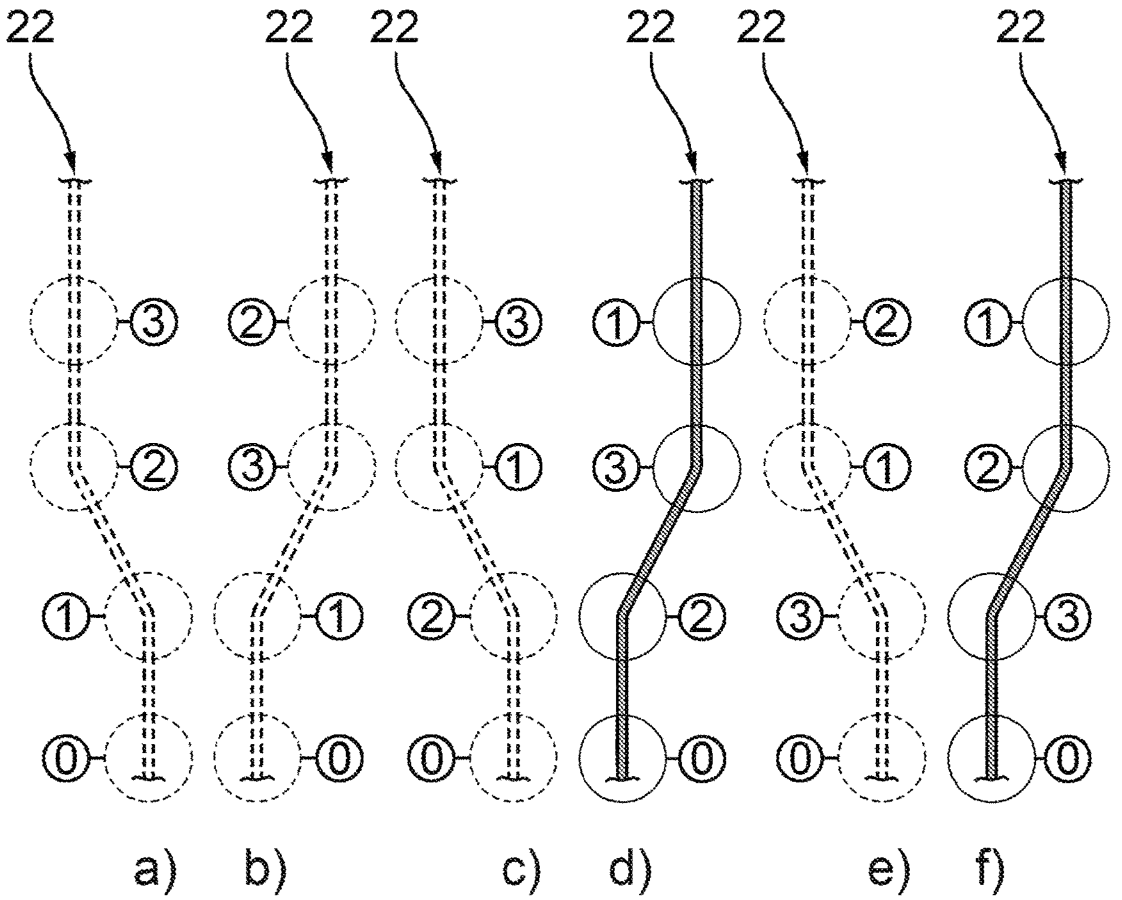
FIG. 3 shows three possible bending sequences to obtain a final configuration from an initial configuration.
Figure 4:
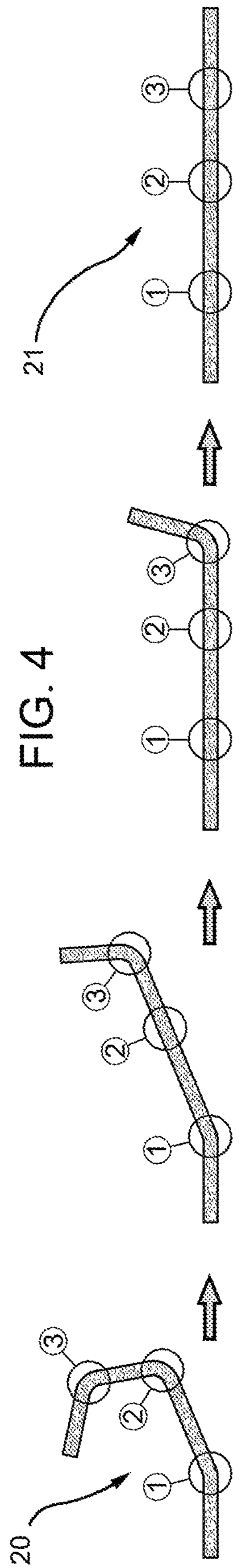
FIG. 4 schematically shows a part of the method according to the present invention.

FIGS. 3 and 4 show an example for determining at least one bending sequence according to the step a). In the example, the tube 2' differs from the initial tube 2 in the presence of N=3 bends (bends numbered 1, 2 and 3). In theory, the final configuration can be obtained starting from the initial configuration by following six different paths (see paths a) to f)).

In greater detail, during the step a2) one or more paths (in theory six paths a) to f)) from the initial configuration 20 to the final configuration 21 are defined. Each path presents a plurality of possible intermediate configurations of the tube 2.

In further detail, each intermediate configuration is connected to a subsequent intermediate configuration by means of a bend (i.e. by the implementation of a respective step of execution).

Furthermore, during the step a2), the respective associated cost for each of the one or more paths is determined, which associated cost is dependent on the cost of the respective bends, i.e. the cost of the respective steps of execution.

Preferably, the respective bends of the one or more paths corresponding to the minimum associated costs, define the one or more explorative bending sequences 22 to be proposed during the step a3).

In addition, during the step a) the intermediate configurations that are not available are excluded, e.g. because they would contact a portion of the bending machine 1.

For example, in the specific case shown in FIG. 3, during the step a) it is determined that the paths d) and f) involve minimal costs, while the paths a), b), c) and e) are less preferable, in particular to be excluded.

In addition, the Applicant has found it advantageous, particularly in terms of calculation time, to define the bent tube 2' as the initial configuration 20 and the non-bent tube 2 as the final configuration 21. In other words, it is advantageous to determine the one or more bending sequences using the calculating unit 12 by starting from the bent tube 2' and defining one or more bending sequences that enable to obtain the non-bent tube 2 and having minimal costs compared to other possible bending sequences.

According to such an embodiment, the bending sequence to be carried out during the step b) corresponds to the reverse order of that determined during the step a), in particular during the sub-step a2).

With reference to the example in FIGS. 3 and 4, during the step a), the calculating unit 12 determined two explorative bending sequences with minimal costs, in particular the bending sequences 0-2-3-1 (path d)) or 0-3-2-1 (path f)). The other possible bending sequences (paths a), b), c) and e)) involve higher costs that make these bending sequences undesirable or impossible. Then, during the step b), the tube 2 is bent according to the bending sequence 1-3-2 or 1-2-3, in particular according to that bending sequence that is chosen by the operator.

The execution of the step a), in particular of the sub-step a2), is explained in greater detail with reference to FIG. 5. FIG. 4 specifically exemplifies the path 0-2-1-3 (path e)) which, however, ultimately turns out to have higher costs than the paths 0-2-3-1 and 0-3-2-1. It can be seen that the bent tube 2' differs from its subsequent intermediate configuration in the bend 2, which in turn differs from the subsequent intermediate configuration in the bend 1, which in turn differs from its subsequent intermediate configuration (i.e. the tube 2) in the bend 3. Therefore, the cost of the respective explorative bending sequence 22 is determined by the cost of the sequence of the bends 2, 1 and 3.

Advantageously, during the step a), a sub-step a4) (simulation) is also performed during which a three-dimensional simulation is executed, by the calculating unit 12, following the bending sequence and/or one or more explorative bending sequences in order to verify the feasibility of the bending sequence and/or one or more explorative bending sequences. In particular, during the sub-step a4), in order to verify the feasibility of the bending sequence and/or one or more explorative bending sequences, it is simulated for the bending sequence and/or for one or more explorative bending sequences whether the tube 2 (even partially bent) or the tube 2' could interfere with, in particular beat against, one or more portions (parts) of the bending machine 1.

In particular, during the step b) only those explorative bending sequences 22 are considered which should not create a risk that the tube 2, the partially bent tube 2 or the bent tube 2' may interfere with the portions of the bending machine 1. However, in order to exclude any risk, it is advantageous to perform step a4).

In greater detail, during the step a4) a three-dimensional model of the bending machine 1 as a whole or partially and of the tube 2 is simulated and the steps of execution, in particular the respective steps of alignment and the respective steps of curving are simulated, during which the intermediate configurations of the tube 2 and (eventually) the bent tube 2' are obtained. In the event that, during the step a4), the simulation of the execution determines that the implementation of at least one of the steps of execution (of the bends) would result in a contact of the tube 2 with a portion of the bending machine 1, the respective explorative bending sequence 22 is discarded and is not proposed during the step a3).

According to some embodiments, a step a5) of signaling is also performed during which a plurality of explorative bending sequences proposed during the sub-step a3) are displayed by means of the human-machine interface 11. Preferably, an operator selects by means of the human-machine interface 11 one of the explorative bending sequences 22 as the bending sequence to be used during the step a). This can be advantageous as the operator, in his choice, can consider additional aspects that are not strictly connected to the operation of the bending machine 1 itself. These aspects may be one or more of the following:

- process steps to be carried out in the plant in which the bending machine 1 is present that follow the finalization of the bends of the tube 2' such as the removal of the tube 2' from the bending machine 1;
- the wish for the bending head 3 or the bending heads 3 to be in a certain configuration following the completion of the step a);
- the specific arrangement of the bending machine 1 in the factory.

In greater detail, during the step a2) the cost of each bending (of each step of execution) is determined at least as a function of the energy necessary and/or the time necessary during the respective step of alignment.

Preferentially, the cost of each bending is determined solely in dependence on the respective step of alignment, in particular a respective alignment cost E associated with each step of alignment (in other words, the alignment cost E is the energetic and/or time cost for executing the respective steps of alignment of the various explorative bending sequences). In other words, the cost of each bending is not determined in dependence on the respective step of curving, in particular the cost of each bending is not determined as a function of the energy needed and/or the time necessary for executing the respective step of curving.

This is advantageous as it facilitates and shortens the calculations of the calculating unit 12. In this context, it should be considered that the same steps of curving are to be carried out for each possible bending sequence (in a different order between the various bending sequences). Furthermore, the differences between the possible bending sequences lie in the step of alignment that varies between the bending sequences. Therefore, the relevant cost for determining whether explorative bending sequence 22 entails a minimal cost than another explorative bending sequence 22 is (substantially) only determined by the steps of alignment.

With reference to the example in FIGS. 3 and 4, while the respective steps of curving 1, 2 and 3 are substantially independent of the sequence itself, the costs resulting from the respective steps of alignment are different. In the case of the bending sequence 0-2-3-1, a first step of alignment must be executed in order to be able to execute the respective step of curving 2, followed by a second step of alignment in order to execute the respective step of curving 3 and finally a third step of alignment in order to execute the respective step of curving 1.

In the case of the bending sequence 0-3-2-1, a first, second and third steps of alignment must be executed in order to execute the respective steps of curving 3, 2 and finally 1.

The same reasoning applies to the bending sequences (a), b), c) and e)) of FIGS. 3 and 4, which are considered disadvantageous from a cost point of view as they are too costly compared to the other cases.

Analogous to the movements to be considered during the step a), the calculating unit 12 considers for determining the cost of each step of alignment:

i) a linear movement $\Delta x$ of the tube 2 along the first axis A;

ii) a rotation 40 of the tube 2 about the first axis A; and iii) a rotation 40 of the bending head 3 about the second axis B.

Then, the calculating unit 12 determines the alignment cost E of each step of alignment in dependence on the respective $\Delta x$, the respective $\Delta\theta$ and/or the respective 42. In particular, the alignment cost E of each step of alignment is determined in proportion to the respective $\Delta x$, the respective $\Delta\theta$ and/or the respective 42.

In greater detail, the calculating unit 12 determines the alignment cost E of each step of alignment according to the following formula:

$$E=w_1*|\Delta x/\Delta x_{max}|+w_2*|\Delta\theta/\Delta\theta_{max}|+w_3*|\Delta\Omega/\Delta\Omega_{max}|,$$

wherein $w_1$, $w_2$ and $w_3$ are respective weighting factors and $\Delta x_{max}$, $\Delta\theta_{max}$ and $\Delta\Omega_{max}$ are respective maximum values.

It should be noted that the relationship with the respective maximum values takes into account the different ranges and the different units. Therefore, the relationship with the respective maximum values scales the respective values and defines an a-dimensional cost.

Furthermore, each movement i), ii) and iii) may be more or less fast and/or may consume less or more energy compared to the other movements i), ii) and iii). This aspect is considered through the choice of the weighting factors. Preferably, the sum of the weighting factors $w_1$, $w_2$ and $w_3$ is equal to 1 ($w_1+w_2+w_3=1$).

Advantageously, during the step a2) the one or more paths corresponding to the minimum associated costs are determined by the calculating unit 12 by means of a graph search algorithm.

Preferably, the graph search algorithm is an A* algorithm. In particular, the A* algorithm identifies a path configuration 20 the final from the initial towards by each intermediate configuration 21 classifying configuration by means of an estimate of the best path that passes through that intermediate configuration.

In particular, by using an A* algorithm, the most promising paths can be determined without the need to calculate all possible paths.

In addition, during the execution of the graph search algorithm, intermediate configurations that are not available are excluded, e.g. because they would contact a portion of the bending machine 1.

In greater detail, during the step a2), one or more paths are explored by means of the execution of the following sub-steps (of A* algorithm):

- a2i) setting the initial configuration 20 as a start configuration;
- a2ii) determining the cost F from the start configuration to a subsequent intermediate configuration in proportion to the sum G of the bending cost (of the respective steps of alignment) from the initial configuration 20 to the subsequent intermediate configuration and a (sub-) estimate of the cost H of the bends (of the respective steps of alignment) of the remaining path from the subsequent intermediate configuration to the final configuration 21 (in other words F=G+H);
- a2iii) repeating the sub-step a2ii) for one or more of the other subsequent intermediate configurations;
- a2iv) choosing the one or more subsequent intermediate configurations with the minimal cost;
- a2v) for each chosen subsequent intermediate configuration setting the subsequent intermediate configuration as the new start configuration and repeating the sub-steps a2ii) to a2v) until arriving at the subsequent intermediate configuration defined by the final configuration 21.

In greater detail, the cost F is determined on the one hand from a cost G calculated as a function of the steps of execution, in particular the respective steps of alignment and/or the alignment costs from the initial configuration 20 to the subsequent intermediate configuration and on the other hand by an estimate of the cost H still necessary to arrive from the subsequent intermediate configuration to the final configuration 21.

In further detail, the respective cost G is calculated as a function of the respective $\Delta x$, the respective $\Delta\theta$ and/or the respective $\Delta\Omega$. In addition, the respective cost H is estimated as a function of the number of bends N and the number of bends already executed; in other words, the respective cost H depends on the number of bends still required to arrive from the respective subsequent intermediate configuration to the final configuration 21.

Figure 6:
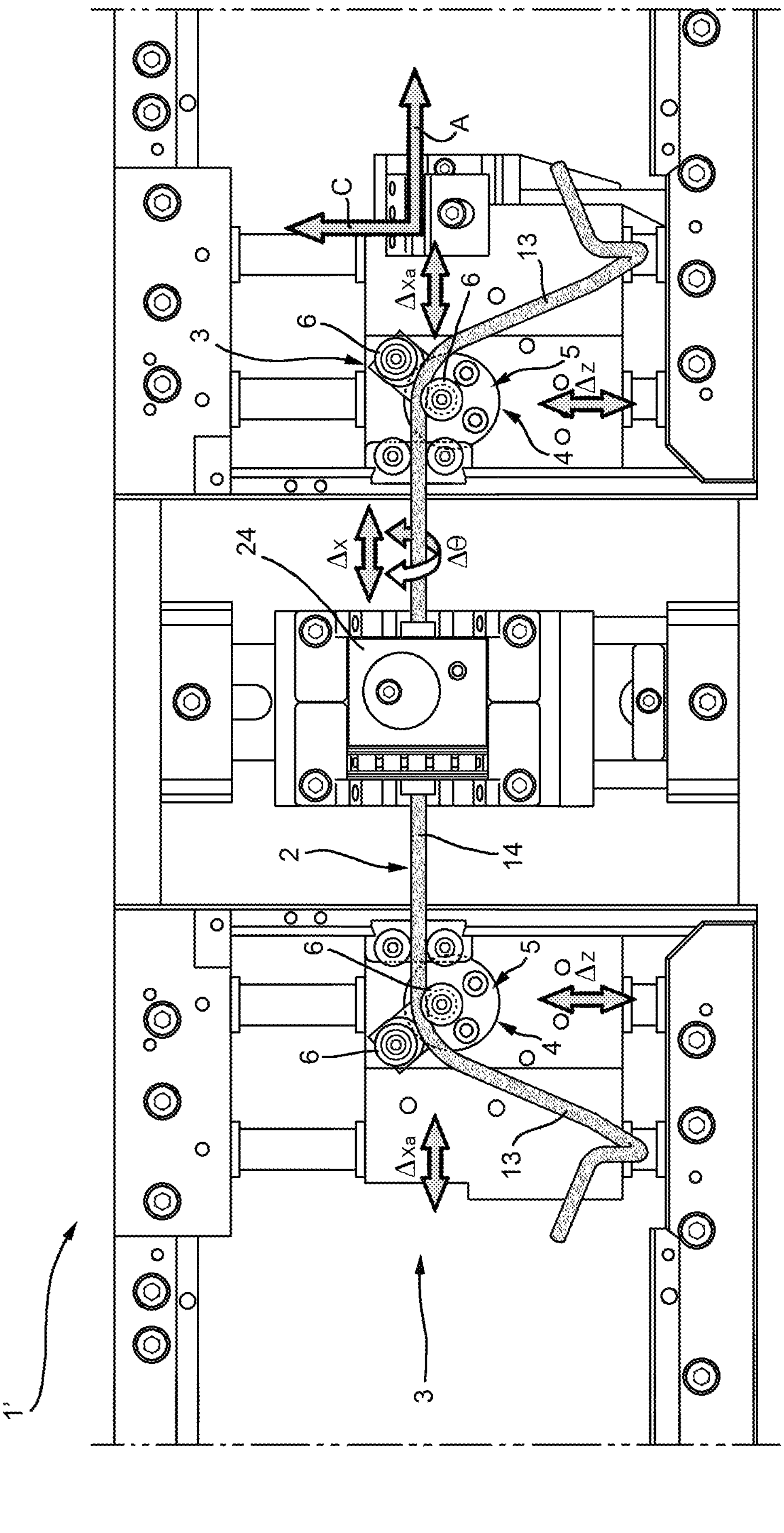
FIG. 6 schematically and partially shows a second embodiment of a bending machine according to the present invention, with parts removed for clarity's sake.

With particular reference to FIG. 6, number 1' denotes a second embodiment of a bending machine according to the present invention. The bending machine 1' is similar to the bending machine 1 and for this reason it is described below only limited to the differences with respect to the bending machine 1 itself, indicating parts that are equal or equivalent to parts already described with the same reference numbers.

In particular, the bending machine 1' differs from the bending machine 1 in that it comprises two bending heads 3 that are spaced apart from each other, in particular along the first axis A.

In particular, the bending machine 1' is configured to bend a tube 2 having two free portions 13. In addition, each bending head 3 is configured to bend a respective free portion 13.

In particular, each bending head 3 comprises a single bending group 4.

In further detail, each bending head 3 is movable along the first axis A and a third axis C, the third axis C being perpendicular to the first axis A and the second axis B.

In addition, the bending machine 1' comprises a gripping device 24 interposed between the bending heads 3, in particular the gripping device 24 is centred relative to the bending heads 3.

More specifically, the gripping device 24 is configured to retain the tube 2 during the operations of the bending heads 3. Preferably, the gripping device 24 is also configured to rotate the tube 2 about the first axis A. In particular, the gripping device 24 defines a second actuation device.

In further detail, during each step of alignment the following movements are executed:

- i) a linear movement $\Delta x$ of the tube 2 along the first axis A;
- ii) a rotation 40 of the tube 2 about the first axis A;
- iv) a linear movement $\Delta z$ of the bending head 3 along the third axis C; and
- v) a linear movement $\Delta x_a$ of the bending head 3 along the first axis A.

Then, during the execution of the step a) the calculating unit 12 determines the alignment cost E of each step of alignment as a function of the respective $\Delta x$, the respective $\Delta\theta$, the respective $\Delta x_a$ and/or the respective $\Delta z$.

In greater detail, the calculating unit 12 determines the alignment cost E of each step of alignment according to the following formula:

$E=w_1*|\Delta x/\Delta x_{max}|+w_2*|\Delta\theta/\Delta\theta_{max}|+w_4*|\Delta x_a/\Delta x_{a,max}|+w_5*|\Delta z/\Delta z_{max}|$, wherein $w_1$, $w_2$, $w_4$ and $w_5$ are respective weighting factors and $\Delta x_{max}$, $\Delta\theta_{max}$, $\Delta x_{a,max}$, and $\Delta z_{max}$ are respective maximum values.

In addition, the limits $\Delta x_{max}$ and $\Delta z_{max}$ can be defined as the extremes of the attainable rectangular area of each bending head 1, $\Delta\theta_{max}$ can be defined as equal to $2\pi$ and $\Delta x_{a,max}$ can be defined as the length of the tube 2 before executing the bending sequence. The weighting factors $w_1$, $w_2$, $w_4$ and $w_5$ can be scaled based on the time and/or energy necessary for executing a step of alignment, and be normalised so that $w_1+w_2+w_4+w_5=1$, in particular 1 denotes a unit cost for executing the step of alignment in terms of energy and/or time.

In further detail, the respective cost G is calculated as a function of the respective values $\Delta x$, $\Delta\theta$, $\Delta x_a$, and $\Delta z$.

Figure 7:
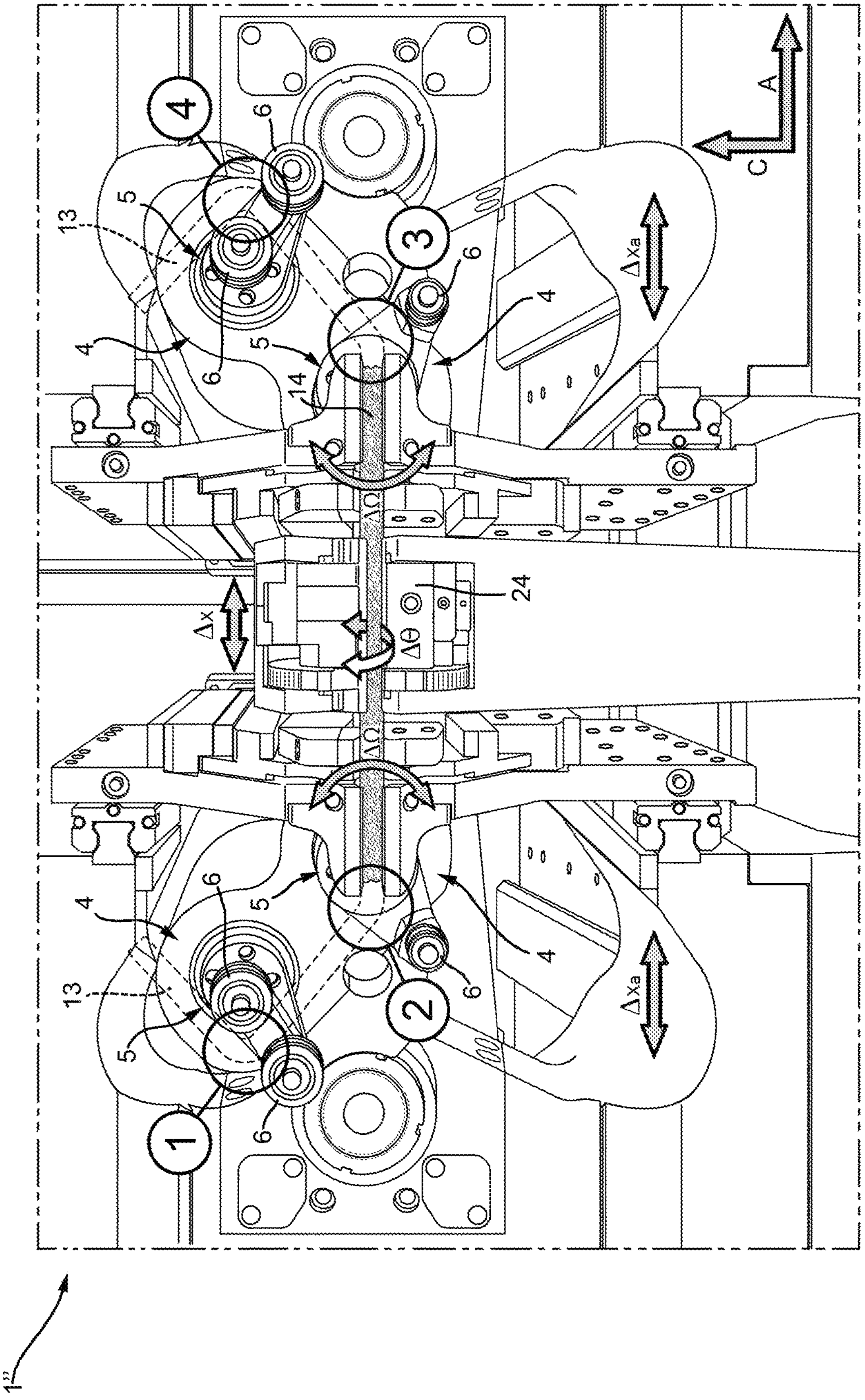
FIG. 7 schematically and partially shows a third embodiment of a bending machine according to the present invention, with parts removed for clarity's sake.

With particular reference to FIG. 7, number 1" denotes a third embodiment of a bending machine according to the present invention. The bending machine 1" is similar to the bending machine 1' and for this reason it is described below only limited to the differences with respect to the bending machine 1' itself, indicating parts that are equal or equivalent to parts already described with the same reference numbers.

In particular, the bending machine 1" differs from the bending machine 1' in that each bending head 3 comprises two bending groups 4.

During each step of alignment the following movements are executed:

i) a linear movement $\Delta x$ of the tube 2 along the first axis A;

ii) a rotation 40 of the tube 2 about the first axis A;

iii) a rotation 40 of the bending head 3 about the second axis B; and v) a linear movement $\Delta x_a$ of the bending head 3 along the first axis A.

Then, during the execution of the step a) the calculating unit 12 determines the alignment cost E of each step of alignment as a function of the respective $\Delta x$, the respective $\Delta\theta$, the respective $\Delta x_a$ and/or the respective 42.

In greater detail, the calculating unit 12 determines the alignment cost E of each step of alignment according to the following formula:

$E=w_1*|\Delta x/\Delta x_{max}|+w_2*|\Delta\theta/\Delta\theta_{max}|+w_3*\Delta\Omega/\Delta\Omega_{max}+w_4*|\Delta x_a/\Delta x_{a,max}|+$, wherein $w_1$, $w_2$, $w_3$, and $w_4$ are respective weighting factors and $\Delta x_{max}$, $\Delta\theta_{max}$, $\Delta\Omega_{max}$ and $\Delta x_{a,max}$ are respective maximum values.

The weighting factors $w_1$, $w_2$, $w_3$ and $w_4$ can be scaled based on the time and/or energy necessary for executing a step of alignment, and be normalised so that $w_1+w_2+w_3+w_4=1$, in particular 1 denotes a unit cost for executing the step of alignment in terms of energy and/or time.

In further detail, the respective cost G is calculated as a function of the respective values $\Delta x$, $\Delta\theta$, $\Delta\Omega$ and $\Delta x_a$.

From an examination of the characteristics of the bending machines 1, 1' and 1" and/or the method according to the present invention, the advantages it allows to be obtained are evident.

In particular, it is possible to determine a bending sequence to be used that avoids interfering with portions of the bending machines 1, 1' and 1" at any time during the execution of the bending sequence, in a fast and reliable manner.

A further advantage is that the bending machines 1, 1' and 1" can also be operated by less trained operators.

Another advantage can be seen in the possibility that an operator can choose a bending sequence to be used from a choice proposed by the calculating unit 12. In this way, the operator can choose the bending sequence also in dependence on factors that are not strictly dependent on the bending machines 1, 1' and 1".

Finally, it is clear that modifications and variations may be made to the bending machine 1, 1' or 1' and the method of bending described and shown here which do not depart from the scope of protection defined by the claims.

The invention claimed is:

1. Method of bending a tubular metal article for obtaining a bent tubular article comprising at least the steps of:

a) determining a bending sequence of the tubular metal article by means of a calculating unit; and b) bending the tubular metal article according to the bending sequence determined during the execution of the step a);

wherein during the step a) at least the following sub-steps are executed by the calculating unit:

a1) defining an initial configuration and a final configuration of the tubular metal article which differs from the initial configuration by a number N of bends;

a2) determining one or more explorative bending sequences as a function of the initial configuration and the final configuration, each explorative bending sequence having a cost (F) which is a function of the bending costs in terms of energy and/or time; and a3) proposing at least one or more explorative bending sequences having minimal costs as the determined bending sequence;

wherein during the step a2) one or more paths from the initial configuration to the final configuration are defined;

wherein each path presents a plurality of intermediate configurations of the tubular metal article;

wherein each intermediate configuration is connected to a subsequent intermediate configuration by means of a bend;

wherein the respective associated cost for each one of the one or more paths is determined, the associated cost being dependent on the cost of the respective bends;

wherein the respective bends of the one or more paths corresponding to the minimum associated costs, define the one or more explorative bending sequences to be proposed during the step a3);

wherein during the step a2) one or more paths are explored by means of the execution of the following sub-steps:

a2i) setting the initial configuration as a start configuration;

a2ii) determining the cost (F) from the start configuration to a subsequent intermediate configuration in proportion to the sum (G) of the bending cost from the initial configuration to the subsequent intermediate configuration and in function of an estimate of the bending cost (H) of the remaining path from the subsequent intermediate configuration to the final configuration;

a2iii) repeating the sub-step a2ii) for one or more of the other subsequent intermediate configurations;

a2iv) choosing the one or more subsequent intermediate configurations with the minimal cost;

a2v) for each chosen subsequent intermediate configuration setting the subsequent intermediate configuration as the new start configuration and repeating the sub-steps a2ii) to a2v) until arriving at the subsequent intermediate configuration defined by the final configuration.

2. Method according to claim 1, wherein each bending comprises at least a step of alignment during which a relative position between the tubular metal article and at least one bending head is modified and a step of curving during which the bending head executes a local bending of the tubular metal article.

3. Method according to claim 2, wherein the cost of each bending is determined, preferably is determined only, as a function of the energy necessary and/or the time necessary for executing the respective step of alignment.

4. Method according to claim 3, wherein during the step of alignment the following movements are to be executed:

i) a linear movement ($\Delta x$) of the tubular metal article along a first axis (A);

ii) a rotation ($\Delta\theta$) of the tubular metal article about the first axis (A);

wherein the cost of each bending is proportional to the linear movement ($\Delta x$) of the tubular metal article and the rotation ($\Delta\theta$) of the tubular metal article.

5. Method according to claim 4, wherein a second axis (B) is perpendicular to the first axis (A) and a third axis (C) is perpendicular to the first axis (A) and the second axis (B);

wherein during the step of alignment also one or more of the following movements are to be executed:

iii) a rotation ($\Delta\Omega$) of the bending head about the second axis (B);

iv) a linear movement ($\Delta z$) of the bending head along the third axis (C);

v) a linear movement ($\Delta x_a$) of the bending head along the first axis (A);

wherein the cost of each bend is also proportional to the rotation ($\Delta\Omega$) of the bending head and/or the linear movement ($\Delta z$) of the bending head along the third axis (C) and/or the linear movement ($\Delta x_a$) of the bending head along the first axis (A).

6. Method according to claim 1, wherein during the step a2), the one or more paths corresponding to the minimum associated costs are determined by means of a graph search algorithm.

7. Method according to claim 1, wherein the initial configuration corresponds to the configuration of the bent tubular article and the final configuration corresponds to the non-bent tubular metal article;

wherein during the step b) the bending sequence is to be carried out in reverse order.

8. Method according to claim 1, further comprising a step a5) of signaling during which a plurality of explorative bending sequences proposed during the sub-step a3) are displayed by means of a human-machine interface and during which an operator chooses through the human-machine interface one of the explorative bending sequences as the bending sequence to be used during the step a).

9. Method according to claim 1, wherein the step a) comprises also a sub-step a4) during which a three-dimensional simulation is executed following the bending sequence and/or one or more of the explorative bending sequences in order to verify the feasibility of the bending sequence and/or the one or more explorative bending sequences.

10. Method according to claim 9, wherein the step b) is executed by means of a bending machine;

wherein during the sub-step a4), in order to verify the feasibility of the bending sequence and/or the one or more explorative bending sequences for the bending sequence and/or the one or more explorative bending sequences it is simulated whether the tubular metal article could interfere with one or more portions of the bending machine and/or with itself.

11. Method according to claim 1, wherein at least one repetition step is executed during which the step b) is repeated with a new tubular metal article based on the bending sequence determined during the execution of the step a) without step a) being performed again.

12. Method according to claim 3, wherein the cost of each bending is not determined as a function of the energy necessary and/or the time necessary for executing the respective step of curving.

* * * * *